(12) United States Patent
Hammock

(10) Patent No.: US 10,525,596 B2
(45) Date of Patent: Jan. 7, 2020

(54) TELEOPERATED ROBOT FOR FLOOD-WELDING OPERATIONS

(71) Applicant: Darryl Hammock, Brighton, MI (US)

(72) Inventor: Darryl Hammock, Brighton, MI (US)

( * ) Notice: Subject to any disclaimer, the term of this patent is extended or adjusted under 35 U.S.C. 154(b) by 0 days.

(21) Appl. No.: 15/427,266

(22) Filed: Feb. 8, 2017

(65) Prior Publication Data

US 2017/0232615 A1 Aug. 17, 2017

Related U.S. Application Data

(60) Provisional application No. 62/293,967, filed on Feb. 11, 2016.

(51) Int. Cl.
| | |
|---|---|
| *H02K 1/12* | (2006.01) |
| *B23K 9/14* | (2006.01) |
| *B25J 9/16* | (2006.01) |
| *B23K 26/342* | (2014.01) |
| *B23K 31/12* | (2006.01) |
| *B23K 26/03* | (2006.01) |
| *B23K 26/08* | (2014.01) |

(52) U.S. Cl.
CPC ........... *B25J 9/1689* (2013.01); *B23K 26/032* (2013.01); *B23K 26/034* (2013.01); *B23K 26/0884* (2013.01); *B23K 26/342* (2015.10); *B23K 31/125* (2013.01); *G05B 2219/39451* (2013.01); *G05B 2219/45104* (2013.01); *Y10S 901/16* (2013.01); *Y10S 901/42* (2013.01); *Y10S 901/47* (2013.01)

(58) Field of Classification Search
CPC ........ B23K 13/025; B23K 11/36; B23K 11/02
See application file for complete search history.

(56) References Cited

U.S. PATENT DOCUMENTS

| | | | | |
|---|---|---|---|---|
| 3,543,947 | A * | 12/1970 | Devol ................. | B23K 11/318 414/733 |
| 4,366,363 | A * | 12/1982 | Wilson ................. | B23K 9/028 219/124.33 |
| 5,670,073 | A | 9/1997 | Kiiluen | |
| 5,681,490 | A * | 10/1997 | Chang ................. | B23K 26/032 219/121.64 |

(Continued)

*Primary Examiner* — Eduardo Colon Santana
*Assistant Examiner* — Charles S Laughlin
(74) *Attorney, Agent, or Firm* — John G. Posa; Belzer PC

(57) ABSTRACT

A remote controlled, tele-operated welder includes a multi-axis robot arm, video cameras, sensors a specialized control station that allows an operator to perform flood-fill welding operations at a remote location to avoid the heat, smoke and other environmental effects produced through typical flood-welding operations. The operator accesses the control unit (OCU) using a GUI and mouse, keyboard, joystick, or other custom controls, and observe the piece via the cameras (visual, thermal, or other) placed in the welding station via a feed displayed on the OCU display(s). Audio, video, and/or tactile feedback may be provided to indicate arm, welder, or other system status, for collision warning and arm motion singularity avoidance. Augmented reality informational graphic/textual overlays may provide guidance to an operator, and the apparatus may further include the ability to repeat series of steps needed to handle flood-weld on a given piece, repeatedly across many pieces.

20 Claims, 8 Drawing Sheets

(56) References Cited

U.S. PATENT DOCUMENTS

| | | | | |
|---|---|---|---|---|
| 6,144,008 | A  * | 11/2000 | Rabinovich | B22F 3/005 |
| | | | | 156/180 |
| 6,455,803 | B1 * | 9/2002 | Fields, Jr. | B23K 26/032 |
| | | | | 219/121.6 |
| 8,992,226 | B1 * | 3/2015 | Leach | G09B 19/24 |
| | | | | 434/234 |
| 2013/0231779 | A1 * | 9/2013 | Purkayastha | B25J 9/1697 |
| | | | | 700/259 |
| 2014/0014637 | A1 * | 1/2014 | Hunt | B25J 9/1689 |
| | | | | 219/124.22 |
| 2016/0105935 | A1 * | 4/2016 | Jones | H05B 11/00 |
| | | | | 219/601 |
| 2016/0288235 | A1 * | 10/2016 | Davidson | B23K 9/06 |
| 2016/0375524 | A1 * | 12/2016 | Hsu | B23K 31/02 |
| | | | | 228/8 |

* cited by examiner

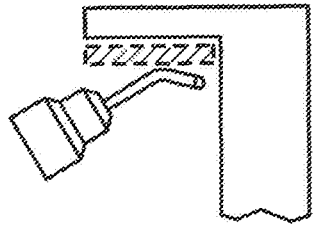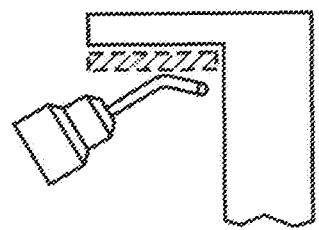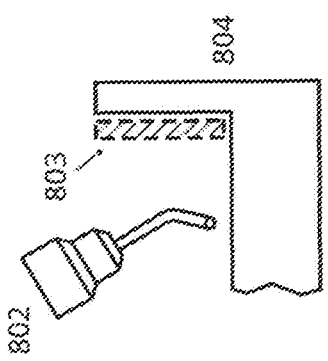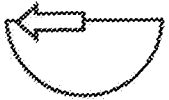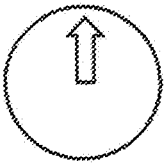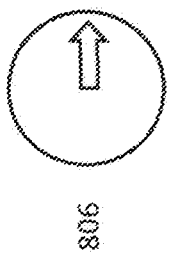
Fig. 8

TELEOPERATED ROBOT FOR FLOOD-WELDING OPERATIONS

REFERENCE TO RELATED APPLICATIONS

This application claims priority to U.S. Provisional Patent Application Ser. No. 62/293,967, filed Feb. 11, 2016, the entire content of which is incorporated herein by reference.

FIELD OF THE INVENTION

This invention relates generally to flood welding and, in particular, to a tele-operated robot specifically designed for flood welding operations.

BACKGROUND OF THE INVENTION

Flood welding is a method by which an existing cavity within a metal block (typically, a "die block" used in manufacturing operations) is filled in a generally continuous manner by depositing new metal material using a welding process. To achieve proper flood welding, a combination of the correct materials, equipment, and welding technique (including use of tools and timing) are applied.

In a typical manual flood fill, a welder begins by preparing the work piece to be welded by removing fatigued metal and cracks through a "scarfing" (a process involving mechanical gouging with a specialized tool to remove material from the piece to be welded) or machining (a process involving the use of machine tools to remove material from the piece to be welded).

The piece is then pre-heated to a temperature in the 800-1000° F. range, and placed in a mounting of some sort (or, if sufficiently large, placed on a floor or other suitable surface). In any case, the piece is positioned so as to make the cavity to be filled accessible and at sufficient angle to enable flood welding operations. The piece to be welded must be fully wrapped in ceramic blankets or similar insulation to retain preheat; localized heat may also be required to ensure that interpass temperature is maintained.

The welding equipment is arranged so as to be in sufficient proximity to the piece to easily reach the cavity to be filled, and the appropriate type of wire and welding materials for the piece are installed into the welding equipment.

Based on the geometry of the cavity and physical configuration of the piece relative to the welder, the operator chooses a welding pattern for filling the cavity. Using their skill, and observing the piece through a protective mask or shield, the welding equipment is operated so as to fill the cavity in the piece beginning at the low area and continuing to the top within the cavity boundaries, with minimal stopping. This is done with the welder depositing the material into the cavity in layers, with one layer of material built upon the other.

Throughout the process, the welder monitors and controls key parameters such as wire supply speed, welding tip angle relative to the piece, temperature of the base material, temperature profile across any given layer, the geometry of the layer, and related characteristics. The operator must observe and ensure "interpass" (between deposition of each layer) temperature is a minimum of 700° F. while welding.

The operator "peens" (applies a hammer to) the area of the weld on the piece. This occurs after the welding step but while the weld remains extremely ("red") hot. A source of heat (such as a furnace, gas/electric source) is applied to equalize the temperature throughout the piece. This is done after peening but prior to the weld piece substantially cooling. The piece is allowed to return to ambient temperature, then placed in a furnace to be tempered. This is done to achieve proper hardness required of the metal deposited in the weld.

When complete, the operator waits for the piece to cool sufficiently to be handled, unmounts the piece, and provides it to the customer for further machining/remanufacturing steps as required.

Although systems for performing remote welding operations have been disclosed, they do not possess the features desired or associated with flood welding. One example is U.S. Publication No. 2014/0014637, which discloses a system enabling a user to control the welding operation occurring within a welding chamber. The system may include a camera or other imaging system (e.g., an infrared imaging system) configured to capture images, which may then be displayed to the user via a suitable display device. Based upon the images from the camera, signals associated with the movements of the welding simulation device may be transmitted to the robotic welder. The user may be located relatively proximal to the location at which the actual welding operations are being performed, such as by being located within the same room as the welding chamber, such that the various components of the system may be directly coupled to one another via suitable communicative links (e.g., suitable cables). Alternatively, the user may be located at any other location around globe, such as by being located in a different building, city and/or country as the location of the welding chamber. In such an embodiment, the various components of the system may be communicatively coupled to one another via a suitable network (e.g., the internet) and/or any other suitable communicative coupling.

The Published '637 Application states that the apparatus being welded may generally comprise any suitable object and/or combination of objects to which a welding operation is desired to be performed. "For instance, in several embodiments, the apparatus may comprise one or more part(s) and/or component(s) that are being assembled and/or repaired during the performance of the welding operation. Additionally . . . the term "welding operation" may refer to any suitable welding operation known in the art, such as the joining of two components or the cladding build-up of a surface. However, one of skill in the art would also appreciate that this definition of "welding operation" does not take into account the complexities of flood-fill welding operations.

SUMMARY OF THE INVENTION

This invention involves the automated guidance of a remote controlled ("tele-operated") welder to achieve a specialized type of welding called "flood welding." The system includes a specialized welding station equipped with a multi-axis robot arm, video cameras, sensors and other inputs, and a specialized control station that allows the operator to move the arm and perform flood-fill operations while monitoring the inputs from the cameras and other sensors.

This allows the operator to mount the piece to be welded in the welding station and configure station as necessary per current practice, but then enter a different physical room located nearby the station to avoid the heat, smoke and other environmental effects produced through typical flood welding operations. The operator accesses the control unit (OCU) using a GUI and mouse, keyboard, joystick, or other custom controls, and observe the piece via the cameras (visual, thermal, or other) placed in the welding station via a feed displayed on the OCU display(s.) The operator commands the system via a graphical user interface (GUI) on the OCU, and may also set the alignment of the piece with the overall system (so the system knows the coordinates of the piece with respect to the mounting and robotic welding arm).

Different embodiments of the invention may incorporate various improvements or modifications independently or in combinations. Audio, video, and/or tactile feedback may be provided in conjunction with various functions. For example, feedback may be provided at the joystick/controller to indicate arm, welder, or other system status. Additional feedback may be presented to the operator based upon measured or estimated proximity of the robot arm to the work piece (i.e., to provide for "collision warning"). This would facilitate "guarded motion" style operation in which the operator is only allowed to guide the robot arm/welder with a motion that does not allow it to collide with the work piece or other objects around the work piece or in the welding cell. Feedback may further be generated in response to proximity of the arm to a motion "singularity" point (e.g., a point at which one or more of the joints are limited in motion by the current position and thus the overall arm cannot move in the desired direction).

The system may incorporate the ability to analyze measurements taken during welding functions and automatically adjust welder settings or provide guidance to operator consistent with generating higher quality flood fill welds. "Augmented reality" informational graphic/textual overlays may be presented on the video feed presented on the monitor to provide guidance to the operator on how to control the arm/welder to generate high-quality flood fill welds. The apparatus may further include ability to repeat series of steps needed to handle flood-weld on a given piece, repeatedly across many pieces.

BRIEF DESCRIPTION OF THE DRAWINGS

FIG. 8 is a series of drawings that depict guarded motion according to the invention.

DETAILED DESCRIPTION OF THE PREFERRED EMBODIMENTS

Figure 1:
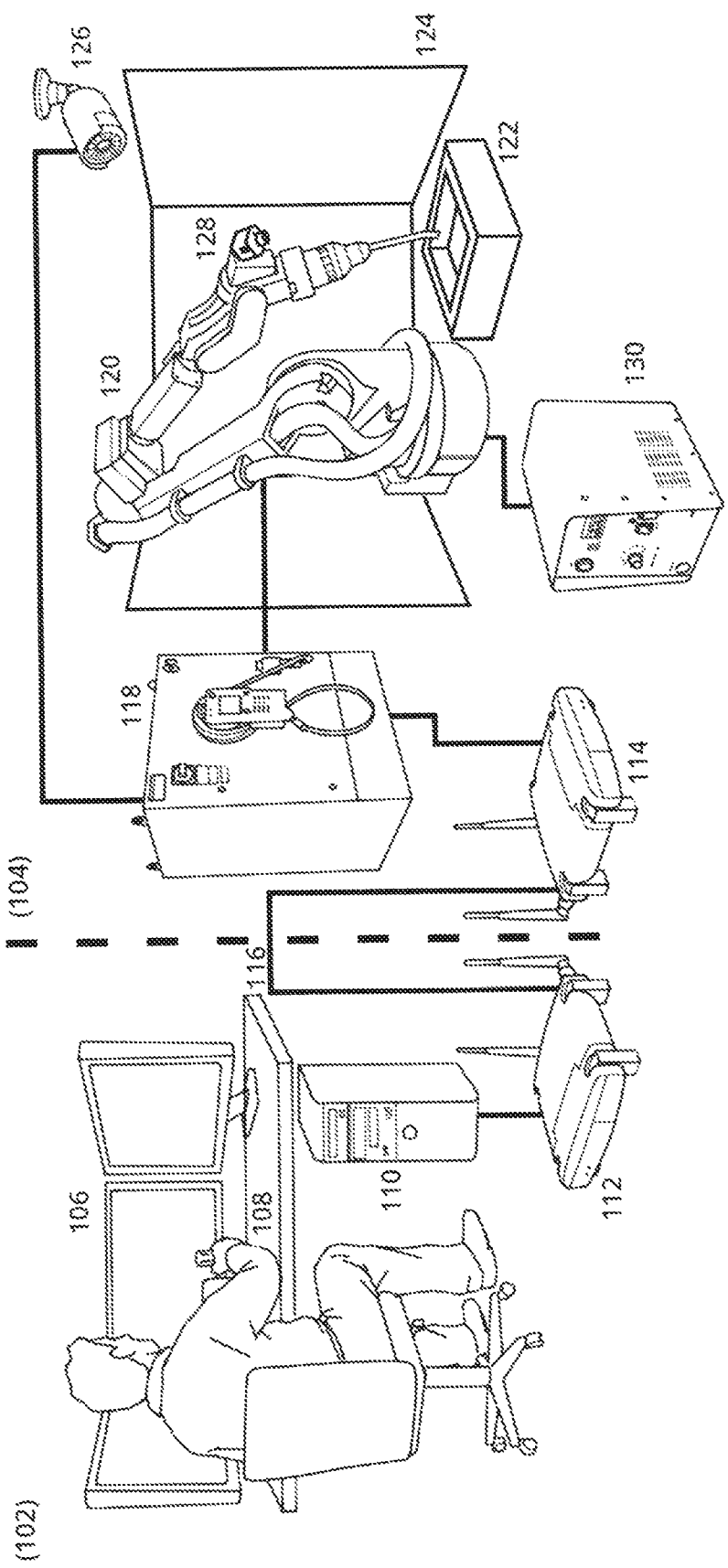
FIG. 1 is a drawing that illustrates major subsystems of the invention.

FIG. 1 is a drawing that illustrates major subsystems of the invention. The welding system is controlled through an Operator Control Unit (OCU) 102 located in a physically separate location from the actual welding operations, which take place in a Welding Room location distinct from the OCU. The Welding Station 104 contains a robot arm, welder, controls, and camera(s) described below.

In use, an operator views one of more screens 106 showing video, system status, etc., including onscreen controls. The operator may use one or more input devices 108 to control the system, which may include a joystick, mouse, keyboard, and/or other input devices. A computer 110 executes OCU software, interfacing with the screens, input devices, and networking and communications hardware 112.

Networking and communications hardware 112 associated with the Operator Control Unit (OCU) 102 interfaces to a corresponding set networking and communications hardware 114 associated with the welding room 104. While a hard-wired link may be implied at 116, it should be understood that the link may be a wired or wireless, short or long range communications link, including linkage over cellular infrastructure, 802.11, internet, satellite, etc.

On the Welding Station side, a multi-axis robot arm 120 is controlled through a computerized system interface 118, which may be situated in any convenient location, and may even be resident in the OCU for "next-room" implementations to provide easy access during use of the system.

The work piece being welded is depicted at 122, and the welder is shown at 130. In the preferred embodiment, a safety gate or fencing 124 extends around arm and piece being welded. One or more camera(s) located in welding room to capture activity of arm, welder, weld, etc. Optional cameras located on robot welding arm to capture activity of welder, weld, etc. Although the robotic arm may be equipped with a conventional welding head, the preferred apparatus is capable of much more robust flood-welding operations of the type shown in U.S. Pat. No. 5,670,073, the entire content of which is incorporated herein by reference.

In accordance with this invention, the operator configures a block or piece to be repaired in a setting that allows the operator to perform the actual welding operations in a different room or other location. In this tele-operated configuration, the welder mounts the piece to be welded in a welding station and configures the station as necessary by adjusting the placement of sensors and cameras relative to the piece. The operator also loads the appropriate feed material and adjusts the welder—for example, to ensure that the proper tip is configured. The operator is then able to enter a different physical location such as room located nearby the station, where the OCU 102 is located. In the event a long-distance telecommunications network is used, at least two operators are involved, one in the OCU and the other in the Welding Room, in which case they may communicate in any suitable manner as by phone or messaging via their own computer displays.

Once all required set-up steps are performed, the work piece is observed via cameras (visible light, short or long range IR, or other) disposed in the Welding Station, and the welding operations are observed via a video feed displayed on the OCU display(s). The operator may optionally command the system via the OCU to set the alignment of the piece with the overall system, so the system knows the coordinates of the piece with respect to the mounting and robotic welding arm. The computerized system interface 110 may be situated in any convenient location, though most likely will be resident at the operator console to provide easy access during use of the system.

During the welding process, the operator manually uses the mouse, joystick, or other specialized controller to remotely control a robotic welding arm 128, typically moving it in close proximity within a cavity in the work piece. The controller is used to execute "flood-fill operations" in a manner similar to the typical manual flood-filling welding operation described above. That is, during the flood-fill operation, the operator will monitor information coming from the system and weld chamber (including, but not limited to, visual feeds of the part/welding site, measurements of welder wire speed, current, and other factors, thermal measurements extracted from the weld point, and so forth). When completed, the operator returns to the Welding Station, unmounting the piece and provides it to the customer for further machining/remanufacturing steps. With long-distance operations, the OCU operator interacts with an operator in the Welding Station to unmounts the piece, etc.

Figure 2:
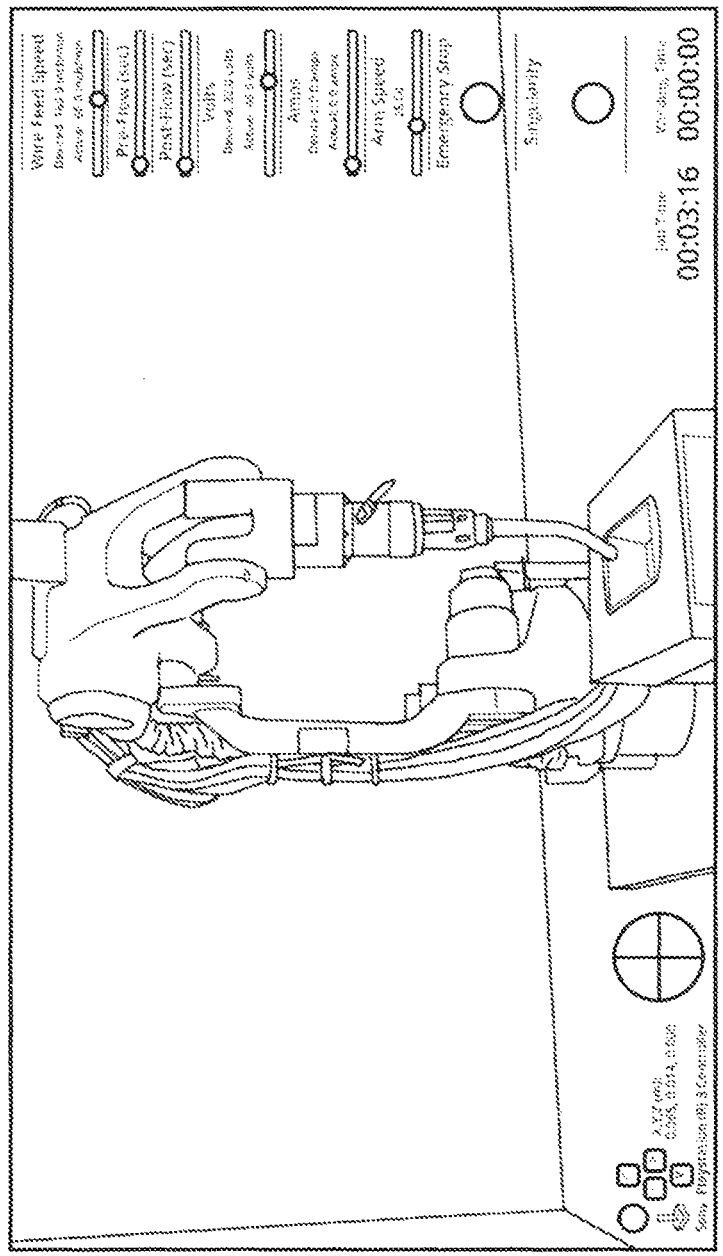
FIG. 2 is a screen display showing a graphical user interface (GUI) and a robotic welding arm in operation.

More particularly, when using the invention, the operator uses the GUI on the OCU, and any mouse, joystick, or other specialized controller provided, to define the area where a flood fill is desired on the piece. FIG. 2 is a screen display of the GUI in operation. During welding, the operator may vary numerous parameters to assure a desired outcome. Such parameters include but are not limited to the angle(s) at which the welding tip should be applied relative to the piece, and the temperature at which the welding tip should be kept during the welding operation. These parameters may or may not use pre-existing geometric models of the work piece, and may further utilize geometric data taken or derived from sensors collocated with the piece/welding tip.

Figure 3:
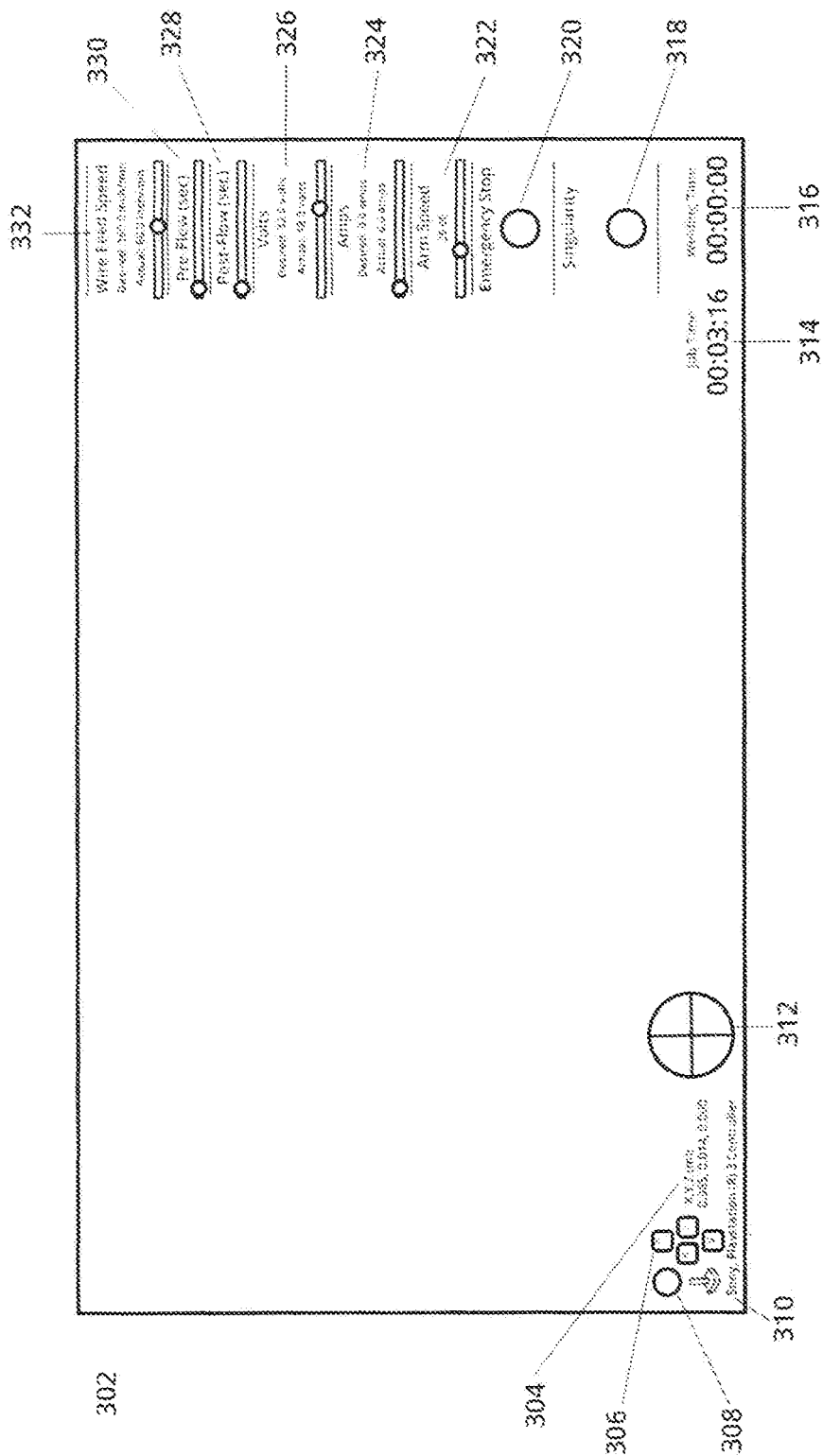
FIG. 3 illustrates an example user interface without a visual of the welding head for enhanced clarification.

FIG. 3 illustrates an example user interface without a visual of the welding head for enhanced clarification. Item 302 denotes an overall user interface shown on the display screen to a welder/operator using the OCU. At the lower right portion of the screen, a welder tip position indicator is shown at 304. Camera pan-tilt controls are provided at 306, and item 308 refers to a trigger lock indicator. Numerical reference 310 is a controller name display. A welder tip attitude indicator is depicted at 312.

Now making reference to the right-hand portion of the screen display, a welding job timer is shown at 314, and 316 indicates the total time that welder has been powered on. Item 318 is a "singularity" indicator. Item 320 is an emergency stop indicator and slide control 322. Control 324 enables the operator to adjust robot arm speed with an indicator that shows the selected speed. Controls 324, 326 enable the operator to respectively adjust current and voltage to the welder head. Control 324 adjusts amperage, whereas control 326 adjusts voltage. Controls 328, 330 facilitate post and pre-load adjustment, respectively, in seconds. That is, 328 refers to the time to run gas after welder turns off, and 330 refers to the time to run gas before welder turns on. Item 332 is a welding wire feed speed indicator and control.

Figure 4:
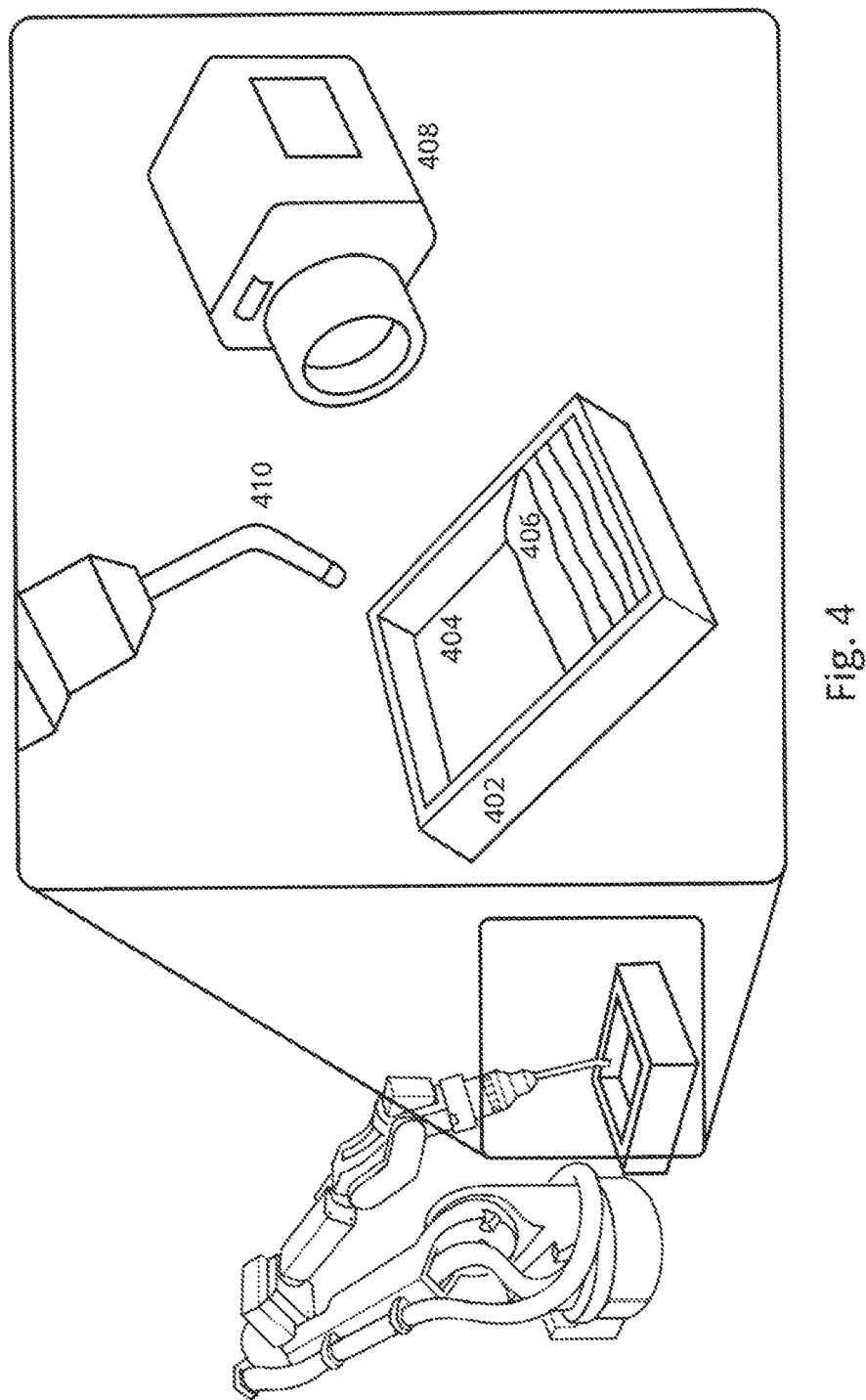
FIG. 4 depicts a simplified monitoring weld site with associated sensors.

FIG. 4 depicts a simplified monitoring weld site with associated sensors. The piece being welded is illustrated at 402. Item 404 is a hole, defect or cavity in the piece being welded via flood-filling using robot arm 410 fitted with a flood-welding tip. Area 406 refers to the most recent layer of welded material as it cools. Thermal camera 410 is directed at piece/most recent layer. In accordance with this invention, an operator manipulates arm 410 robotically from a remote location to add additional layers within cavity 404 until the entire defect is repaired. At this point the piece is sent to other locations for finish work, be it grinding, machining, polishing, and so forth.

By virtue of the invention, the operator may perform one or more of the following operations:

1. Full manual operation of the robotic welding arm.
2. "Teach" the system to lay a geometric layer for this particular cavity/piece, which can then be repeated automatically to form a complete fill. The operator manually uses the mouse, joystick, or other specialized controller to remotely control a robotic welding arm, moving it in close proximity with the cavity in the piece, then execute a single deposit (geometric layer) of a flood fill operation in a manner similar to the typical manual flood-filling welding operation described above. Simultaneously, while the operator is manually guiding the robot welding arm for the single layer, the system captures the commands used (to command motion, control the welder, and similar) and the motions generated, and creates a program ("macro") that can be used to automatically guide the system in creating successive layers.

3. Use "automated" planning to generate welding paths/plan. Using a graphical user interface (GUI) on the OCU, and any mouse, joystick, or other specialized controller, to define the number of layers and related parameters for the flooding operation. The system then uses this information to create logical geometric welding paths and subsequent program that can be used to fill the cavity via flood filling approach.

The system may execute automated flood-filling based on either a repetition and incremental modification of the learned path (from above), or the automated program. In both cases, the operator observes the piece on the OCU screen, including an overlay of the planned path/route, and when he/she desires, gives an execute command. The OCU system then sends commands to the robotic welder to execute the operations to lay one or more layers of metal via the welding operation.

Figure 5:
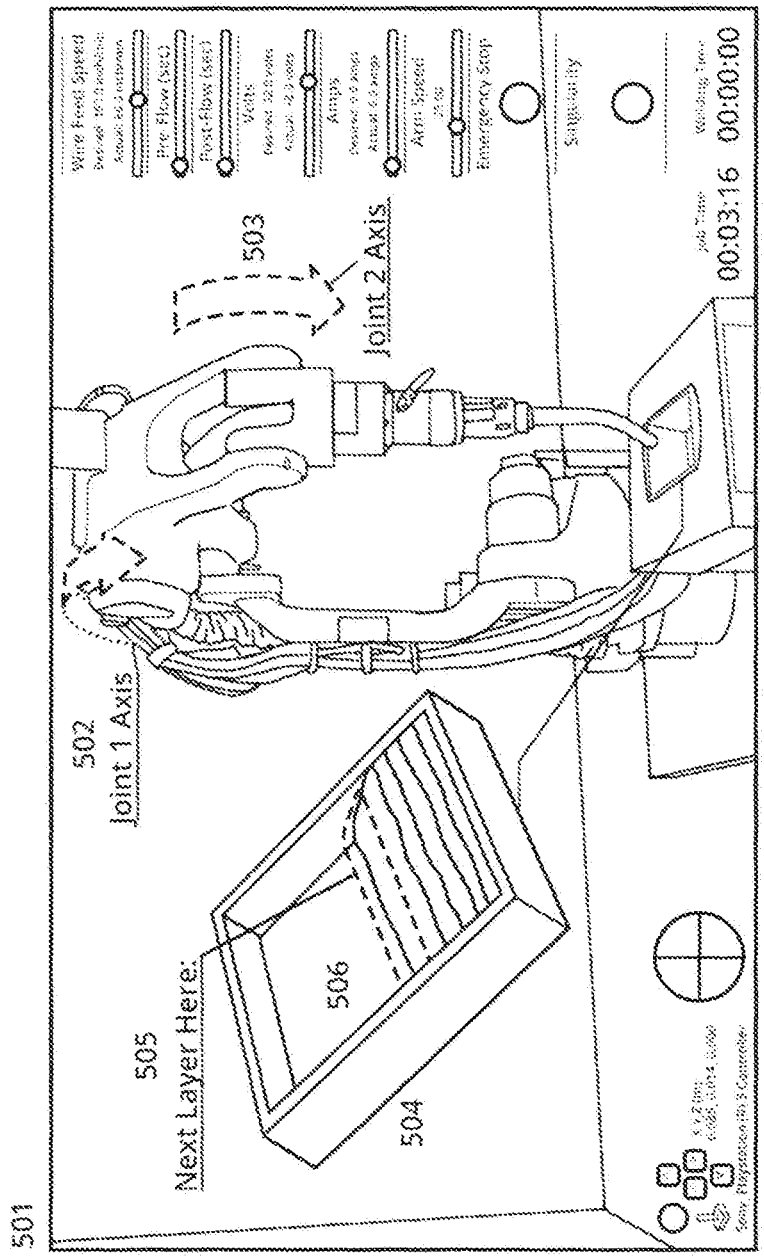
FIG. 5 is a diagram that shows augmented reality overlays.

Numerous enhancements are available to assist the operator in carrying out welding operations. One such enhancement, shown in FIG. 5, involves the use of augmented reality overlays. Screen display 501 shows the 'normal' operator control view/interface, but also includes additional 'augmented reality' overlays. Examples include computer-generated text and virtual arrows 502, 503 labeling each arm control axis and showing the directions of motion the axis can move, overlaid on live video feed, to assist the operator in determining possible articulations. Another example is inset video feed 504, which shows a close-up view of weld site and work piece, further illustrating the cavity 506 to be filled and the next layer 505 of material to be added. Such computer-rendered instructions overlaid on the video in relevant location(s) provides a graphical representation of where the next weld layer should be placed, thereby helping the operator visualize their next steps.

Figure 6:
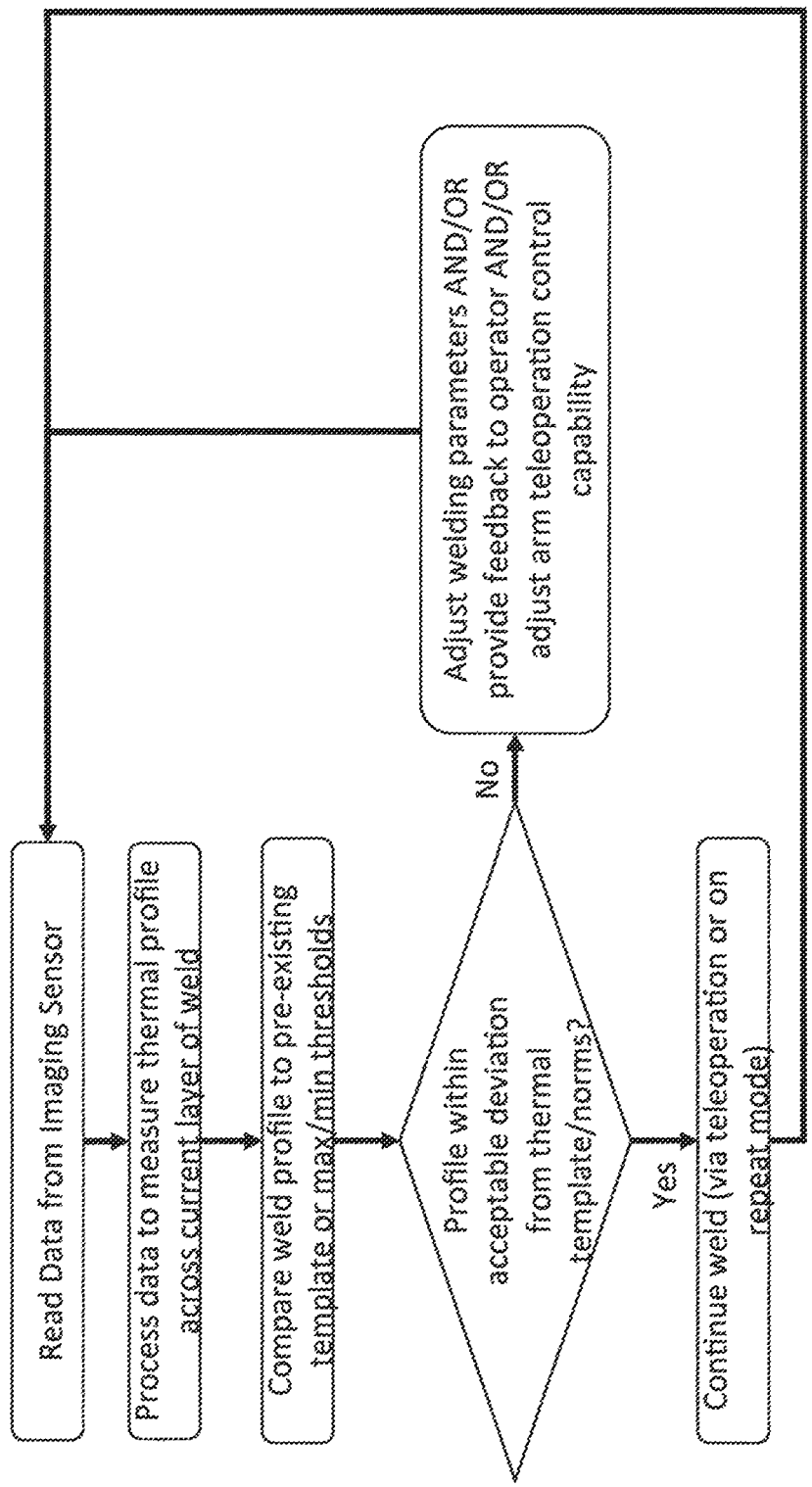
FIG. 6 is a flow diagram that illustrates how feedback can maintain a welding profile within acceptable deviation from thermal templates and norms.

Various feedback loops may be provided to achieve enhanced results. For example, the flow diagram of FIG. 6 illustrates how feedback can maintain a welding profile within acceptable deviation from thermal templates and norms. In accordance with this process, data are read from an imaging sensor at the welding site. The data are processed to measure the thermal profile across the current layer of the weld. The thermal profile is compared to previously stored templates representing acceptable parameters such as minimum and/or maximum threshold values. If the result of the comparison is acceptable, the welding process continues as normal. If the result is outside of acceptable norms, any one or more of a variety of different corrective actions can be taken; for example, welding parameters can be adjusted, feedback guidance may be provided to the operative; and/or the robotic arm may be adjusted manually or through tele-operated control procedures.

Figure 7:
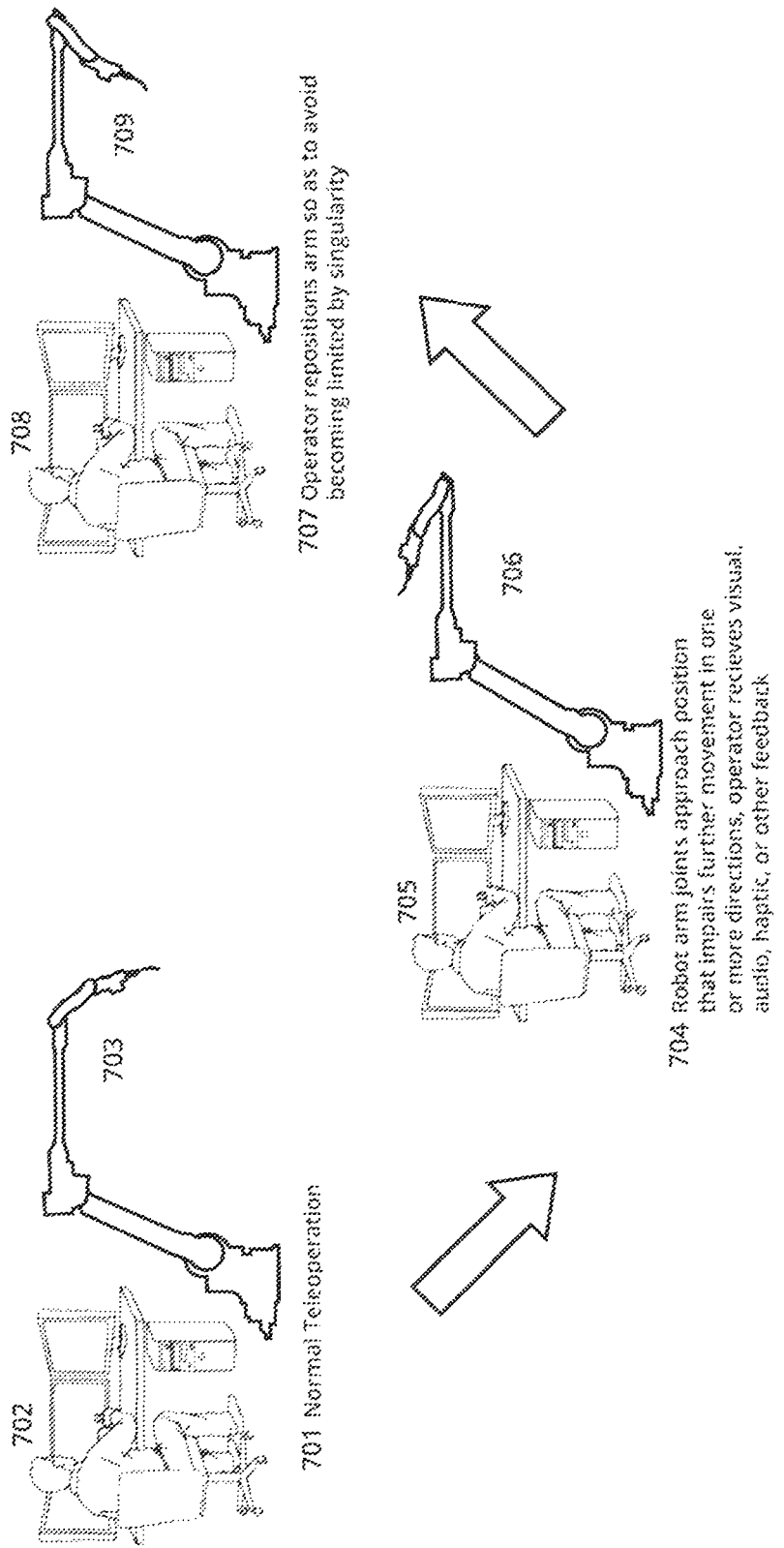
FIG. 7 illustrates how feedback may be used to avoid unwanted singularities.

FIG. 7 illustrates how feedback may be used to avoid unwanted singularities. "Singularities" are interruptions in the motion of the robot arm due to algorithm(s) used to control the joints of the arm, whether at the shoulder, elbow or wrist. More technically, singularities are caused by the inverse kinematics of the robot. When placed at a singularity, there may be an infinite number of ways for the kinematics to achieve the same tip position of the robot. If the optimal solution is not chosen, assuming there is one, the robot joints could be commanded to move in a manner that cannot be resolved without some form of intervention.

Reference 701 in FIG. 7 illustrates normal tele-operation. The operator is at the control station, the tele-operating welding arm is operatively setup, and the arm is not experiencing any singularity. As such, there is no singularity related feedback presented at control station 702, and the robot arm/welder 703 is under control, with freedom of movement. At 704, the robot arm joints approach a position that impairs further movement in one or more directions. In this case the operator receives some form of feedback related to this condition, which may be visual, audio, haptic (as described below), or any combination of these or other forms of alert as the arm approaches singularity. In response to the feedback, one corrective measure taken by the operator involves repositioning the arm so as to avoid the singularity, as shown at 707. The operator at control station 708 decreases the visual/haptic/audible feedback as the arm retreats from singularity, and the robot arm/welder 709 retreats from the singularity and returns to controlled behavior.

Another issue address by the invention, somewhat unique to flood-welding operations, relates to "guarded motion" associated with proximity to the work piece itself or the "walls" of the cavity or other defect being filled. FIG. 8 is a series of drawings that depict guarded motion according to the invention. FIG. 8A represents normal welding, with the robot-arm-mounted welding tip 802 in close proximity to work piece 804 but not "too close." Area 803 represents the spatial area where arm/tip combination will be "too close" and potentially collide with the work piece being welded. Item 806 is a simple diagram showing a free range of motion, such that the arm/tip vector can move in any direction. While arm/tip is operating in an area with no collision potential, range of motion for arm/tip is free as shown at 805.

In FIG. 8B, the arm/tip approaches spatial area 803 where a collision between arm/tip and work piece may occur. The range of motion for arm/tip remains free, however operator begins to receive haptic/visual/audible feedback 808 at control to alert them to the fact they have approached the "too close region." To implement collision avoidance, when the welding tip is sufficiently proximate to zone 803, tip motion may be restricted manually or automatically so as not to allow penetration of "too close region" by the arm tip. In an automatic mode, this restriction 810 may be carried out regardless of operator input.

The system may, using a thermal imager or other thermal sensing device, capture the temperature of the layer of metal as it is being applied, after the welder has temporarily stopped midway through the layer, or immediately following the completion of the layer. The system will log this data both for later review as well as online inspection. For online inspection, an algorithm running on the OCU will automatically evaluate the temperature levels and geometric distribution to ensure the layer has been applied in a fashion suitable to build upon (in a following layer). Should the captured temperature data indicate a problem with the weld, the system will alert the operator via the OCU and await further instruction prior to continuing any automated operations.

The system may, using a visible light, thermal, laser, or other imager, capture the appearance of the layer of metal as it is being applied, after the welder has temporarily stopped midway through the layer, or immediately following the completion of the layer. The system will log this data both for later review as well as online inspection. For online inspection, an algorithm running on the OCU will automatically evaluate the appearance to ensure the layer has been applied in a fashion suitable to build upon (in a following layer). Should the captured appearance data indicate a problem with the weld, the system will alert the operator via the OCU and await further instruction prior to continuing any automated operations.

The system may, using a visible light, thermal, laser, or other imager, capture the geometry of the layer of metal as it is being applied, after the welder has temporarily stopped midway through the layer, or immediately following the completion of the layer. The system will log this data both for later review as well as online inspection. For online inspection, an algorithm running on the OCU will automatically evaluate the geometry to ensure the layer has been applied in a fashion suitable to build upon (in a following layer). Should the captured geometric data indicate a problem with the weld, the system will alert the operator via the OCU and await further instruction prior to continuing any automated operations.

Using one or more microphones or acoustic pickups, the system may capture the sounds of the building of the layer of metal as it is being applied. The system will log this data both for later review as well as online inspection. For online inspection, an algorithm running on the OCU will automatically evaluate the acoustic emissions to ensure the layer has been applied in a fashion suitable to build upon (in a following layer). Should the captured acoustic emission data indicate a problem with the weld, the system will alert the operator via the OCU and await further instruction prior to continuing any automated operations.

The system may, using digital measurement techniques, capture the parameters of the welder (current signal, voltage signal, etc.) as each layer of metal as it is being applied. The system will log this data both for later review as well as online inspection. For online inspection, an algorithm running on the OCU will automatically evaluate the welder operating condition parameters to ensure the layer has been applied in a fashion suitable to build upon (in a following layer). Should the captured welder operating condition data indicate a problem with the weld, the system will alert the operator via the OCU and await further instruction prior to continuing any automated operations.

The operator or user may further have the ability to instruct the system, via the GUI on the OCU or attached controllers, to stop executing any automatic operation, cease motion and any welding operation, and revert to manual tele-operated control or other safety-state. At the end of an automated or semi-automated flood welding operation, the system may generate a digital report containing detailed information logged during the welding process, including commands executed, stills/videos captured, measurements captured, analysis outputs, and other information of interest.

The invention claimed is:
1. A system for remotely performing flood-fill welding operations, comprising:
   a welding station disposed in a welding room, the welding station including:
      a support adapted for placement of a body having a cavity to be filled with metal through flood welding; wherein the cavity is a three-dimensional cavity having sidewalls, and wherein the entire body is preheated prior to the flood-fill welding operation;
      a multi-axis robot arm including a welding tip operative to access the cavity;

wherein the welding tip includes a wire feed, a gas feed, and an electric arc operative to perform a flood-fill welding operation using the wire and gas feeds;

at least one camera mounted on the multi-axis robot arm having a field of view including the cavity to be filled and the sidewalls of the cavity; and at least one camera mounted in the welding room to view the multi-axis robot arm; and an operator control unit (OCU) disposed remotely from the welding room, the OCU including:

a display operative to display images acquired by the cameras;

wherein the display further includes a graphical user interface (GUI) enabling the operator to adjust one or more of the speed of the wire feed, the flow of the gas feed, and the electrical current associated with the electric arc; and an interface enabling the operator to move the robot arm in three dimensions with respect to the body to flood fill the cavity between the sidewalls thereof through the successive application and build-up of material deposited into the cavity.

2. The system of claim 1, wherein the interface enabling the operator to move the robot arm includes a joystick.

3. The system of claim 1, wherein the graphical user interface (GUI) further includes a mouse or other pointing device.

4. The system of claim 1, further including one or more sensors to monitor the temperature of the body during a welding operation.

5. The system of claim 1, further including an infrared camera to view thermal characteristics of a welding operation.

6. The system of claim 1, further enabling the operator to set the alignment of the piece, such that the system knows the coordinates of the piece with respect to the mounting and robotic welding arm.

7. The system of claim 1, further including a teaching mode of operation wherein manual motions are recorded and automatically incorporated into subsequent welding operations.

8. The system of claim 1, further including an automatic mode of operation wherein a repeated, layer-by-layer application of material fills the cavity while under automated control, including the automated generation of weld-head routes.

9. The system of claim 1, further including the ability to use the robotic arm in a fully manual mode including the manual generation of weld-head routes associated with flood welding.

10. The system of claim 1, further including the automated collection/logging of data as layers are applied in conjunction with a flood welding operation.

11. The system of claim 1, further including a memory for storing data associated with a welding operation and a processor for analyzing the data to determine weld quality.

12. The system of claim 1, further including audible, visual or tactile feedback to assist an operator in performing a welding operation.

13. The system of claim 12, wherein the feedback is provided at the joystick or controller to indicate robot arm, welder, or other system status.

14. The system of claim 12, wherein the feedback is based upon measured or estimated proximity of the robot arm to the sidewalls of the body to provide for collision warning.

15. The system of claim 12, wherein the feedback is generated in response to the proximity of the arm to a motion singularity point, defined as a point at which a robot arm joint may become limited in motion.

16. The system of claim 1, further including memory or storing desired welding parameters, and wherein the system automatically analyzes measurements taken during a welding operation and automatically adjust welder settings or provides guidance to operator by comparing the measurements to the stored parameters.

17. The system of claim 1, further including a display generator operative to present augmented reality informational graphical/textual overlays on the display to provide guidance to the operator regarding the manner in which the robot arm or welding tip is controlled to generate higher quality flood fill welds.

18. The system of claim 1, further including a processor for performing a teaching mode of operation an operator manually controls the robot welding arm to flood fill a single layer of material, whereupon the system captures the commands used and the motions generated, to creates a macro to automatically guide the system in creating successive layers.

19. The system of claim 1, further including a guarded motion mode of operation wherein the motion of the welding tip is manually or automatically restricted to avoid collision with the sidewalls of the cavity.

20. The system of claim 1, wherein the at least one camera mounted on the multi-axis robot arm captures the appearance of each layer of metal as it is applied for viewing by an operator on the display of the OCU.

* * * * *